(12) United States Patent
Ha et al.

(10) Patent No.: US 7,948,565 B2
(45) Date of Patent: May 24, 2011

(54) LIQUID CRYSTAL DISPLAY DEVICE

(75) Inventors: Heon Soo Ha, Jung-ri (KR); Jong Hyun Park, Busan (KR)

(73) Assignee: LG Display Co., Ltd., Seoul (KR)

( * ) Notice: Subject to any disclaimer, the term of this patent is extended or adjusted under 35 U.S.C. 154(b) by 127 days.

(21) Appl. No.: 12/234,333

(22) Filed: Sep. 19, 2008

(65) Prior Publication Data

US 2009/0231500 A1 Sep. 17, 2009

(30) Foreign Application Priority Data

Mar. 11, 2008 (KR) .................. 10-2008-0022488

(51) Int. Cl.
*G02F 1/1335* (2006.01)

(52) U.S. Cl. ............ 349/12; 349/96; 349/112; 349/122; 345/173

(58) Field of Classification Search ............ 349/12, 349/96, 112, 122; 345/173
See application file for complete search history.

(56) References Cited

U.S. PATENT DOCUMENTS

| 7,538,759 B2 * | 5/2009 | Newton | 345/173 |
| 7,586,562 B2 * | 9/2009 | Ito | 349/98 |
| 2006/0046071 A1 * | 3/2006 | Richter et al. | 428/432 |

FOREIGN PATENT DOCUMENTS

| CN | 1987612 A | 6/2007 |
| CN | 101010263 A | 8/2007 |
| KR | 10-2007-0060816 A | 6/2007 |
| KR | 10-0739331 B1 | 7/2007 |

OTHER PUBLICATIONS

Office Action issued in corresponding Chinese Patent Application No. 200810213565.2; issued Mar. 30, 2010.

\* cited by examiner

*Primary Examiner* — Mark A Robinson
*Assistant Examiner* — Michael P Mooney
(74) *Attorney, Agent, or Firm* — Brinks Hofer Gilson & Lione

(57) ABSTRACT

A liquid crystal display device which improved brightness by preventing a wet out phenomenon caused by narrowing of a space between an upper polarizer and a touch panel is provided. The device includes a liquid crystal display panel for display images; a backlight unit for emitting light from the bottom of the liquid crystal display panel; upper and lower polarizers formed on top and bottom surfaces of the liquid crystal display panel, respectively; a light diffusion bead formed on the upper polarizer for controlling a haze of the upper polarizer; a support main for organizing the liquid crystal display panel and the backlight unit; a cover bottom for covering a lower surface and one side surface of the support main; a case top for covering and fixing the edges of the liquid crystal display panel and the cover bottom; and a touch panel, whose edges are fixed by the case top, formed on the upper polarizer formed with the light diffusion bead.

5 Claims, 3 Drawing Sheets

LIQUID CRYSTAL DISPLAY DEVICE

RELATED APPLICATIONS

This application claims the benefit of the Korean Patent Application No. 10-2008-0022488, filed on Mar. 11, 2008, which is hereby incorporated by reference as if fully set forth herein.

BACKGROUND

1. Field of the Invention

The present invention relates to a liquid crystal display device, and more particularly, to a liquid crystal display device for preventing wet out.

2. Discussion of the Related Art

A cathode ray tube (CRT) is one of display devices generally used mainly for monitors of televisions (TVs), measuring instruments, information devices, etc. However, the heavy weight and a great bulk of the CRT, it is difficult to use while responding to the demand for miniaturization and light-weight of electronic products.

Therefore, the CRT has some limitations in the weight or size for the miniaturization and light-weight of various electronic products of current trend. To replace the CRT, LCDs (liquid crystal display devices) using electro-optical effect, PDPs (Plasma Display Panel) using gas discharge, and ELDs (Electro Luminescence Display) using electro luminescent effect have been suggested. Among these, LCDs are under active research.

Recently, the LCDs, which have the advantages of miniaturization, light-weight, and low power consumption to substitute the CRT have been developed to serve as a flat display device. The LCDs are used for monitors of desktop computers and large information display devices, in addition to laptop computers. Thus, the demand for the LCDs is continuously increasing.

Meanwhile, a touch panel is one of computer peripheral devices for inputting readily determined information into a computer by pressing a touch panel on the display surfaces of image display devices such as cathode-ray tubes (CRTs), liquid crystal displays (LCDs), field emission displays (FEDs), plasma display panels (PDPs), and electro luminescence displays (ELDs).

Front and rear surfaces of an LCD have a front polarizer and a rear polarizer attached thereon, respectively. Haze, among the characteristics of the front and rear polarizers, represents a degree of light transmittance and scattering of the reflected light. When the haze is low, a difference in the screen brightness at the areas for blocking light such as black matrix or wirings is great, thereby causing unsmooth images. On the other hand, when the haze is high, the resolution is reduced.

FIG. 1 is a simplified perspective view illustrating a general liquid crystal display device.

As shown in FIG. 1, the liquid crystal display device comprises a liquid crystal display panel 30 for displaying images, a fluorescent lamp 31 for generating light, a lamp housing 32 in U-shape for covering the fluorescent lamp 31, a light diffusion plate 35, a first prism sheet 37, and a second prism sheet 36 layered on one surface of the liquid crystal display panel 30 in this order, a protective sheet 38, a light guide plate 33, and a reflective plate 34.

The liquid crystal display device further comprises a support main 39 for organizing and fixing the liquid crystal display panel 30 and a backlight unit.

Here, the fluorescent lamp 31, lamp housing 32, light diffusion plate 35, first and second prism sheets 37 and 36, protective sheet 38, light guide plate 33, and reflective plate 34 are referred to as the backlight unit.

The backlight unit functions to emit light to a display region A of the liquid crystal display panel 30. The display region A, not shown in FIG. 1, comprises two transparent plates attached with polarizers at the exterior surfaces, and a liquid crystal interposed between the inner surfaces of the two transparent plates.

Further, the liquid crystal display device comprises a driving circuit 40 for driving the display region A.

Although not shown in FIG. 1, the liquid crystal display device having the above constitutions is further equipped with a cover bottom for covering a lower surface and one side surface of the support main 39, and a case top for covering the edges of the liquid crystal display panel 30 and the cover bottom.

Further, the liquid crystal display device comprises a touch panel (not shown) on the top of the liquid crystal display panel 30. Both edges of the touch panel are fixed to the case top.

The liquid crystal display device also comprises an upper and lower polyerizers formed on top and bottom of the liquid crystal display panel 30, respectively.

FIG. 2 is a cross-sectional view illustrating a liquid crystal display device combined with a touch panel according to a conventional art.

As shown in FIG. 2, the liquid crystal display device comprises a support main 2, a backlight unit and a liquid crystal display panel 10 laminated inside the support main 2, a cover bottom 14 for covering a lower surface and one side surface of the support main 2, a case top 16 for covering the edges of the liquid crystal display panel 10 and the cover bottom 14, a touch panel 26 formed on the liquid crystal display panel 10 and fixed to the edges of the case top 16 using a double sided tape 27, and a protective film 28 formed on the touch panel 26.

Here, the support main 2 is a mold product molded to have a step-shaped projection surface at the inner surface. The very lower layer inside the support main 2 is installed with the backlight unit, and the liquid crystal display panel 10 is formed on the backlight unit.

The liquid crystal display panel 10 is equipped with a lower substrate 10b for forming switch devices (TFT), and an upper substrate 10a for forming color filters.

Here, a liquid crystal is interposed between the lower substrate 10b and upper substrate 10a.

Top and bottom surfaces of the liquid crystal display panel 10 are installed with polarizers 22 and 24. The lower polarizer 22 formed on the bottom surface of the liquid crystal display panel 10 polarizes light beam supplied from the backlight unit and provides the polarized light beam to the liquid crystal display panel 10.

The upper polarizer 24 formed on the top surface of the liquid crystal display panel 10 polarizes the light beam supplied from the liquid crystal display panel 10 and emits the polarized light beam to the outside.

The cover bottom 14 is installed to cover a lower surface and one side surface of the support main 2. The case top 16 is installed to cover the upper surface and side surfaces of the support main 2 to fix the support main 2 and the liquid crystal display panel 10 together.

The backlight unit comprises a lamp housing 18 equipped with a light source 20, a light guide plate 6 for altering incident light from the light source 20 to a surface light source, optical sheets 12 formed on the light guide plate 6 for increasing efficiency of light that transmits into the liquid crystal display panel 10, and a reflective plate 4 formed on the lower surface of the light guide plate 6 for reflecting light emitted to the rear surface of the light guide plate 6 back into the liquid crystal display panel 10.

The light source 20 supplies predetermined light, which corresponds with power supplied from an exterior power unit, toward the light guide plate 6. Light from the light source emitted to the opposite side of the light guide plate 6 is reflected at the lamp housing 18, and then retransmitted into the light guide plate 6.

The light guide plate 6 distributes the light, incident from the light source 20, uniformly in the entire region thereof. That is, the light guide plate 6 uniformly distributes the incident light from the light source 20 to allow uniform light be transmitted into the liquid crystal display panel 10.

The reflective plate 4 reflects light incident from the lower surface of the light guide plate 6. That is to say, the reflective plate 4 reflects light incident from the light guide plate 6 so as to provide the incident light to the liquid crystal display panel 10.

The optical sheets 12 comprise upper/lower light diffusion sheets and upper/lower prism sheets. The optical sheets 12 diffuse light incident from the light guide plate 6 to distribute the light uniformly on the entire surface of the light guide plate 6.

Further, the optical sheets 12 increase a surface brightness by refracting and condensing the diffused light and diffuse light to widen a viewing angle.

The touch panel 26 is formed on the top surface of the liquid crystal display panel 10 cased by the case top 16 and the cover bottom 14.

Further, the double sided tape 27 is used to combine the touch panel 26 on the liquid crystal display panel 10.

The touch panel 26 is placed on the upper substrate 10a of the liquid crystal display panel 10 using the double sided tape 27 adhered on the top surface of the case top 16. The touch panel 26 is pressed with a stylus pen or a finger at the display screen projected from the liquid crystal display panel 10 to generate and detect corresponding positional signals.

In the conventional liquid crystal display device, the upper polarizer 24 is made of a hard coating film, and the lower polarizer 22 is made of an anti-glare 25% or a clear type film.

BRIEF SUMMARY

Accordingly, the present invention is directed to a liquid crystal display device that substantially obviates one or more problems due to limitations and disadvantages of the related art.

That is, when combining a touch panel on top of a liquid crystal display panel, a space between an upper polarizer and the touch panel is narrowed and a thickness of the touch panel itself is thinned, due to demands for thin devices. As a result, when the space between the upper polarizer and the touch panel becomes 1 mm or less, the touch panel and the upper polarizer touch each other causing a wet out phenomenon as shown in FIG. 3.

An object of the present invention is to provide a liquid crystal display device which improved brightness by preventing a wet out phenomenon caused by narrowing of a space between an upper polarizer and a touch panel.

A liquid crystal display device comprises a liquid crystal display panel for display images; a backlight unit for emitting light from the bottom of the liquid crystal display panel; upper and lower polarizers formed on top and bottom surfaces of the liquid crystal display panel, respectively; a light diffusion bead formed on the upper polarizer for controlling a haze of the upper polarizer; a support main for organizing the liquid crystal display panel and the backlight unit; a cover bottom for covering a lower surface and one side surface of the support main; a case top for covering and fixing the edges of the liquid crystal display panel and the cover bottom; and a touch panel, whose edges are fixed by the case top, formed on the upper polarizer formed with the light diffusion bead.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE DRAWINGS AND THE PRESENTLY PREFERRED EMBODIMENTS

Reference will now be made in detail of the present invention, examples of which are illustrated in the accompanying drawings.

Figure 1:
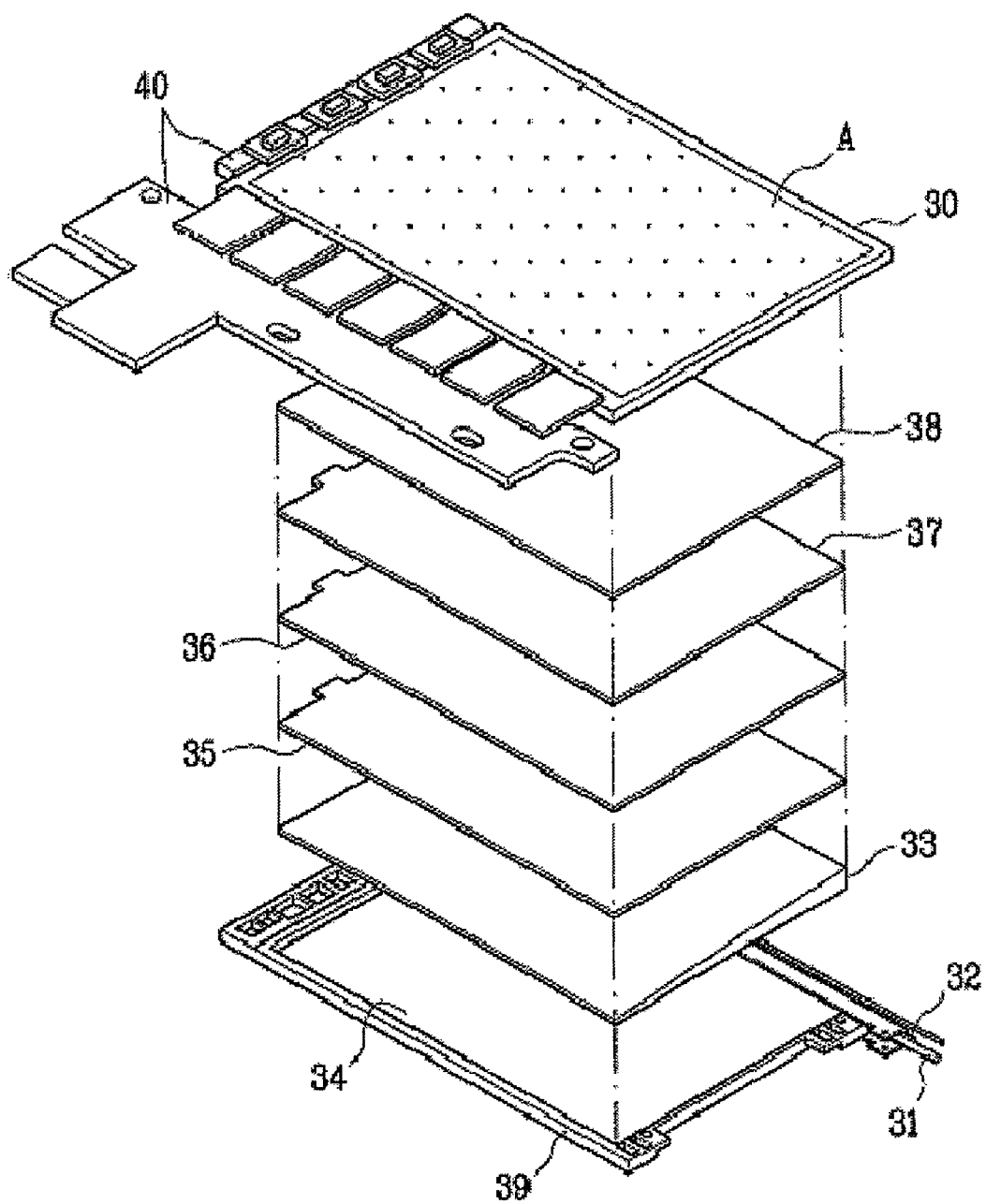
FIG. 1 is a simplified perspective view illustrating a general liquid crystal display device.
Figure 2:
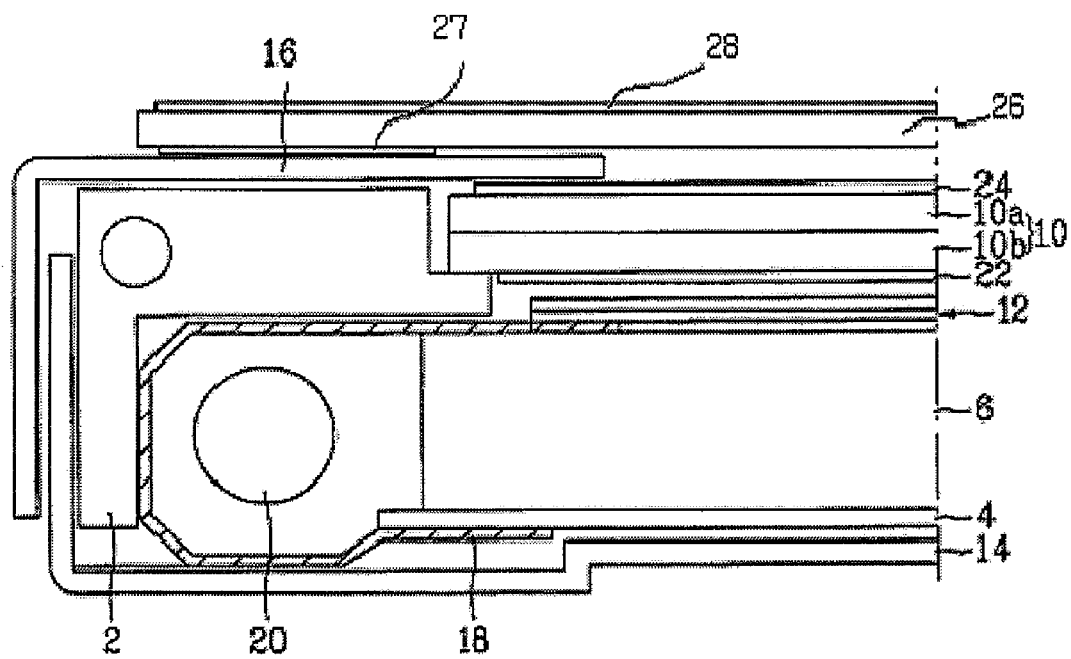
FIG. 2 is a cross-sectional view illustrating a liquid crystal display device combined with a touch panel according to a conventional art.
Figure 3:
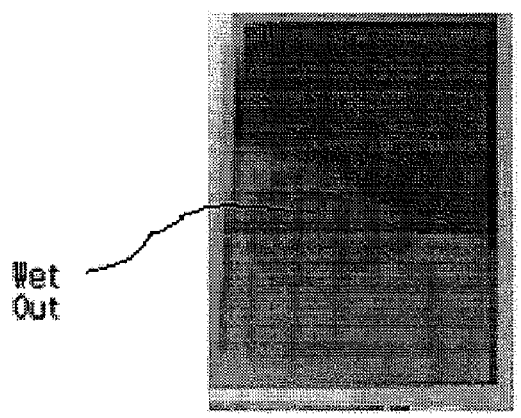
FIG. 3 is a view illustrating a problem of a liquid crystal display device according to a conventional art.
Figure 4:
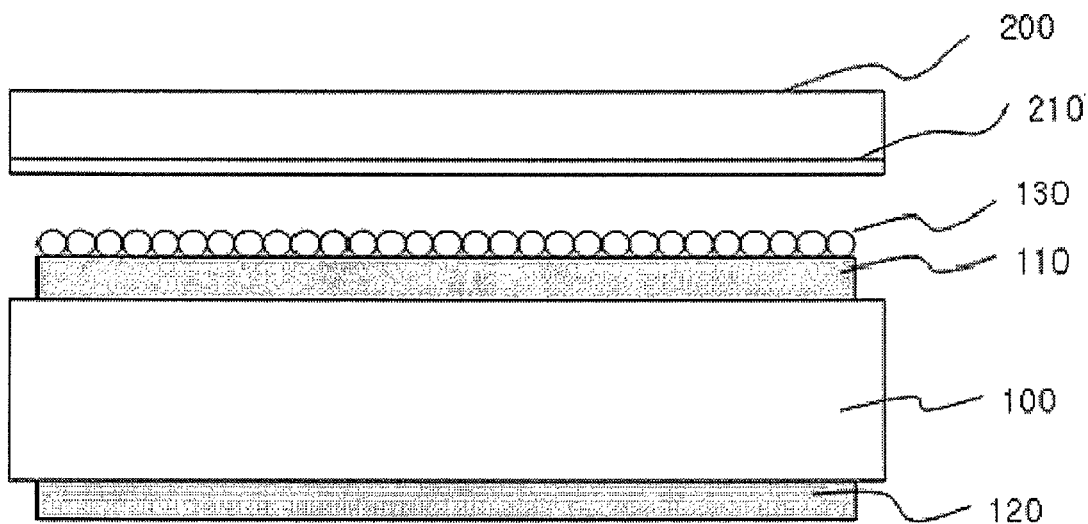
FIG. 4 is a cross-sectional view illustrating a process for combining a liquid crystal display panel and a touch panel in a liquid crystal display device according to an embodiment of the present invention.

FIG. 4 is a cross-sectional view illustrating a process for combining a liquid crystal display panel and a touch panel in a liquid crystal display device according to an embodiment of the present invention.

As shown in FIG. 4, a liquid crystal display device comprises a liquid crystal display panel 100 for displaying images, a lower polarizer 120 formed on the bottom surface of the liquid crystal display panel 100, an upper polarizer 110 formed on the top surface of the liquid crystal display panel 100, a light diffusion bead 130 formed on the top surface of the upper polarizer 110, and a touch panel 200 formed on the top surface of the upper polarizer 110.

The touch panel 200 is formed with a silicon oxide 210 on the bottom surface thereof.

The light diffusion bead 130 is formed on the upper polarizer 110 having its surface treated with an anti-glare (AG) treatment or a similar treatment thereof. The diffusion bead 130 is formed to have embossing on its surface. That is, when an appropriate AG coating is added to the upper polarizer to which the silicon oxide 210 on the bottom surface of the touch panel 200 is touched, embossing is formed on the surface of the upper polarizer. As a result, the wet out phenomenon can be prevented despite that the smooth surface of silicon oxide 210 on the bottom surface of the touch panel 200 touches the upper polarizer.

When the light diffusion bead 130 has embossing as mentioned above, scratch generation is prevented even when a space between the touch panel 200 and the upper polarizer 110 is narrowed, thereby preventing wet out.

A haze of the light diffusion bead 130 is determined according to a haze of the upper polarizer 110 adhered thereon. At this time, the haze of the upper polarizer 110 is about 25% or more.

For example, when the haze of the upper polarizer 110 is 44%, the haze of the lower polarizer 120 can be 12% or more. When the haze of the upper polarizer 110 is 12%, the haze of the lower polarizer 120 can be about 25% or more.

In a preferred embodiment of the present invention, the upper polarizer 110 may have a haze of about 44% or more. That is, in the present invention, the upper polarizer 110 is formed with the light diffusion bead 130 on its surface. Thus, by controlling the haze of the light diffusion bead 130 on the upper polarizer 110, a backlight mura phenomenon is removed, thereby improving brightness. Further, since the touch panel 200 is formed on the upper polarizer 110 formed with the light diffusion bead 130, even though the space between the light diffusion bead 130 and the upper polarizer 110 is narrow, the wet out phenomenon can be inhibited by the light diffusion bead 130 that controls the haze.

The following Table 1 illustrates characteristics of polarizers according to a haze of each polarizer.

TABLE 1

| Polarizer type | | Wet Out | Glaring |
|---|---|---|---|
| Upper | Lower | | |
| Hard coating | Clear | NG | OK |
| Hard coating | AG 25% | NG | OK |
| AG 25% | Clear | OK | NG |
| AG 44% | Clear | OK | OK |

As can be seen from Table 1, the appearance of the polarizer can be optimized when the upper polarizer has a haze of AG 44% and the lower polarizer is clear. That is, when the upper polarizer has a haze of AG 44% and the lower polarizer is clear, the glaring can be reduced in addition to inhibiting the wet out generation.

When the touch panel 200 is combined on top of the liquid crystal display panel 100, the upper polarizer 110 requires a haze of AG 25% or more to improve wet out in the case where a space between the upper polarizer 110 and the lower surface of the touch panel 200 is a thin concept of 1 mm or less.

Further, the upper polarizer 110 requires a haze of AG 44% or more to improve glaring that generates by the interference between the touch panel 200 and liquid crystal display panel 100.

Figure 5:
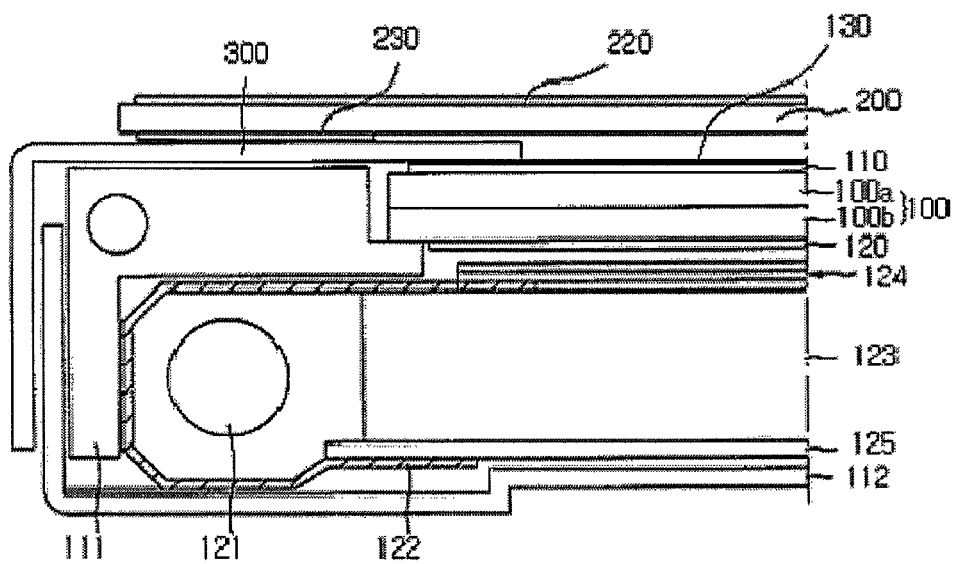
FIG. 5 is a partial cross-sectional view illustrating a liquid crystal display device according to an embodiment of the present invention.

FIG. 5 is a partial cross-sectional view illustrating a liquid crystal display device according to an embodiment of the present invention.

As shown in FIG. 5, a liquid crystal display device comprises a support main 111, a backlight unit and a liquid crystal display panel 100 laminated in the support main 111, a lower polarizer 120 formed on the bottom surface of the liquid crystal display panel 100, an upper polarizer 110 formed on the top surface of the liquid crystal display panel 100, a light diffusion bead 130 formed on the upper polarizer 110 for controlling a haze of the upper polarizer 110, a cover bottom 112 for covering a lower surface and one side surface of the support main 111, a case top 300 for covering the edges of the liquid crystal display panel 100 and the cover bottom 112, a touch panel 200, whose sides are fixed to the edges of the case top 300 using a double sided tape 230, formed on the top surface of the upper polarizer 110 with a predetermined space apart from the upper polarizer 110, and a protective film 220 formed on the touch panel 200.

Here, the touch panel 200 is formed with a silicon oxide 210 of FIG. 4, as shown in FIG. 4.

The support main 111 is a mold product molded to have a step-shaped projection surface at the inner side surface. The very lower layer inside the support main 111 is installed with the backlight unit, and the liquid crystal display panel 100 is formed on the backlight unit.

The liquid crystal display panel 100 is equipped with a lower substrate 100b for forming switch devices (TFT), and an upper substrate 100a for forming color filters. A liquid crystal is interposed between the lower substrate 100b and upper substrate 100a.

The lower polarizer 120 formed on the bottom surface of the liquid crystal display panel 100 polarizes light beam supplied from the backlight unit and provides the polarized light beam to the liquid crystal display panel 100. The upper polarizer 110 formed on the top surface of the liquid crystal display panel 100 polarizes the light beam supplied from the liquid crystal display panel 100 and emits the polarized light beam to the outside.

The cover bottom 112 is installed to cover a lower surface and one side surface of the support main 111. The case top 300 is installed to cover the upper surface and side surfaces of the support main 111 to fix the support main 111 and the liquid crystal display panel 100 together.

At this time, the backlight unit comprises a lamp housing 122 equipped with a light source 121, a light guide plate 123 for altering incident light from the light source 121 to a surface light source, optical sheets 124 formed on the light guide plate 123 for increasing efficiency of light that transmits into the liquid crystal display panel 100, and a reflective plate 125 formed on the lower surface of the light guide plate 123 for reflecting light emitted to the rear surface of the light guide plate 123 back into the liquid crystal display panel 100.

The light source 121 supplies predetermined light, which corresponds with power supplied from an exterior power unit, toward the light guide plate 123. At this time, light from the light source emitted to the opposite side of the light guide plate 123 is reflected at the lamp housing 122, and then retransmitted into the light guide plate 123.

The light source 121 can be an emitting device such as a fluorescent lamp or LED. The reflective plate 125 is made of aluminum or grapheme with a reflective material formed on the grapheme. The reflective material is selected from Ag, $Al_2O_3$, $TiO_2$, Al, PET, and optical fibers.

The light guide plate 123 distributes the light, incident from the light source 121, uniformly in the entire region thereof. That is, the light guide plate 123 uniformly distributes the incident light from the light source 121 to allow uniform light be transmitted into the liquid crystal display panel 100.

As the light guide plate 123, use can be made of a prism light guide plate formed with a plurality of prism mountains formed in parallels with a predetermined space apart from each other.

The reflective plate 125 reflects light incident from the lower surface of the light guide plate 123. That is to say, the reflective plate 125 reflects light incident from the light guide plate 123 so as to provide the incident light to the liquid crystal display panel 100.

The optical sheets 124 comprise upper/lower light diffusion sheets and upper/lower prism sheets. The optical sheets 124 diffuse light incident from the light guide plate 123 to distribute the light uniformly on the entire surface of the light guide plate 123.

Further, the optical sheets 124 increase a surface brightness by refracting and condensing the diffused light and diffuse light to widen a viewing angle.

The touch panel 200 is formed on the top surface of the liquid crystal display panel 100 cased by the case top 300 and the cover bottom 112.

Further, the double sided tape 230 is used to combine the touch panel 200 on the liquid crystal display panel 100.

The touch panel 200 is placed on the upper substrate 100a of the liquid crystal display panel 100 using the double sided tape 230 adhered on the top surface of the case top 300. The touch panel 200 is pressed with a stylus pen or a finger at the display screen projected from the liquid crystal display panel 100 to generate and detect corresponding positional signals.

The preferred embodiments of the present invention have been described in the above. However, it will be apparent to those skilled in the art that various modifications and variations can be made in the present invention without departing from the spirit or scope of the inventions.

As can be seen from the above, the liquid crystal display device of the present invention has the following effects.

That is, the light diffusion bead for controlling a haze is formed on the surface of the upper polarizer, and as a result, despite the narrow space between the upper polarizer and the touch panel formed thereon, the embossing of the light diffusion bead can prevent the wet out phenomenon.

The invention claimed is:

1. A liquid crystal display device comprising:
   a liquid crystal display panel for display images;
   a backlight unit that emits light from the bottom of the liquid crystal display panel;
   upper and lower polarizers formed on top and bottom surfaces of the liquid crystal display panel, respectively;
   a light diffusion bead formed on the upper polarizer for controlling a haze of the upper polarizer;
   a support main that organizes the liquid crystal display panel and the backlight unit;
   a cover bottom that covers a lower surface and one side surface of the support main;
   a case top that covers and fixing the edges of the liquid crystal display panel and the cover bottom;
   a touch panel, whose edges are fixed by the case top, formed on the upper polarizer formed with the light diffusion bead, and
   a silicon oxide formed on the rear surface of the touch panel,
   wherein at least a portion of the silicon oxide is apart from the light diffusion bead.

2. The device according to claim 1, wherein the touch panel and case top are fixed together using a double sided tape.

3. The device according to claim 1, further comprising a protective film formed on top surface of the touch panel.

4. The device according to claim 1, wherein the light diffusion bead has embossing.

5. The device according to claim 1, wherein the light diffusion bead controls the upper polarizer to have a haze of 44%.

* * * * *